United States Patent [19]

Fujimoto

[11] Patent Number: 4,714,855

[45] Date of Patent: Dec. 22, 1987

[54] PIEZO-ELECTRIC ACTUATOR AND STEPPING DEVICE USING SAME

[75] Inventor: Toshitaka Fujimoto, Tokyo, Japan

[73] Assignee: NEC Corporation, Tokyo, Japan

[21] Appl. No.: 860,392

[22] Filed: May 7, 1986

[30] Foreign Application Priority Data

May 7, 1985 [JP] Japan .................................. 60-96225

[51] Int. Cl.⁴ ............................................ H01L 41/08
[52] U.S. Cl. ................................................... 310/328
[58] Field of Search ................ 310/328, 323, 317, 319

[56] References Cited

U.S. PATENT DOCUMENTS 3,666,975 5/1972 Balamuth ............................ 310/323
4,219,755 8/1980 O'Neill et al. ...................... 310/328
4,547,086 10/1985 Matsumoto et al. ............ 310/328 X Primary Examiner—Mark O. Budd Attorney, Agent, or Firm—Sughrue, Mion, Zinn, Macpeak & Seas

[57] ABSTRACT

A piezo-electric actuator has two generally parallel arms spaced from each other and being connected at two longitudinally spaced positions by first and second supports. One support includes an electric distortion effect element and the other constitutes a hinge. Two such actuators may be joined by a second electric distortion effect element fixed at opposite ends to the faces of the support for two actuators constituting the hinge connection for the arms of said actuators. A disc rotor mounted for rotation about its axis may have its peripheral edge and passing through the gap between the ends of the arms remote from said first and second supports, which arm ends constitute clamping members for periodic clamping said rotor. Transfer of the disc, incrementally, results from elongation distortion of the second electric distortion effect element. The electric distortion effect elements are preferably piezo-electric elements.

5 Claims, 8 Drawing Figures

PIEZO-ELECTRIC ACTUATOR AND STEPPING DEVICE USING SAME

FIELD OF THE INVENTION

The present invention relates to a piezo-electric actuator, and more particularly, to a stepping device utilizing a plurality of such piezo-electric actuators.

BACKGROUND OF THE INVENTION

Stepping motors have been used in moving elements, both linearly and rotatively, particularly for rotating a disc about its axis. Conventional stepping motors, however, have disadvantages of poor electrical to mechanical energy conversion efficiency and are characterized by large consumptions of electrical energy. Furthermore, conventional stepping motors are plagued by the difficulty in controlling minute linear movements of rotations through small angles because of the miniaturization limit of the coil and permanent magnet conventionally employed in such stepping motors.

SUMMARY OF THE INVENTION

It is, therefore, a primary object of the present invention to provide an improved piezo-electric actuator capable of minute movement having high electrical to mechanical energy transformation efficiency.

It is a further object of the present invention to provide an improved piezo-electric actuator having lower power consumption, and capable of being coupled to a further piezo-electric actuator through a piezo-electric junction element and to thereby create a compact and highly efficient stepping device.

According to the present invention, an actuator comprises two generally parallel arms, each having opposite forward and rearward ends, with first and second supports connecting the two arms at longitudinally spaced, different positions with one said supports constituting a first element having electric distortion effect and the second support constituting a hinge coupling to thereby permit, upon the application of electrical energy to the first element, pivoting of the arms about a pivot axis defined by the support constituting a hinge to cause the forward ends of the arms to move towards and away from each other. The first and second support may be coupled to the arms at respective ends thereof by reduced cross-sectional portions constituting integral hinges between the supports and the arms to facilitate pivoting of said arms in response to electrically induced distortion of the first electric distortion effect element. The forward ends of the arms may terminate in right angle projections facing each other to define clamping faces between said forward ends of said arms.

A pair of such actuators may be mechanically coupled in laterally spaced apart position with said actuators extending parallel to each other by a second electric distortion effect element, permitting by selective energization of said first electric distortion effect elements, clamping and unclamping of the arms of respective actuators and lateral positional change between said first and second actuator by energization and de-energization of said second electric distortion effect element.

By fixedly positioning one of said actuators and permitting the other actuator to shift laterally away from or toward said fixed actuator, and alternate clamping of a strip of material positioned between the arms of respective actuators, the material may be progressively step advanced by a sequence of; clamping said material between the clamping arms of the actuator which is relatively fixed by momentarily energizing its electric distortion effect element; energizing the second electric distortion effect element mechanically linking said two actuators, to cause said nonfixed actuator to a step along said interposed strip of material; clamping of said material by said laterally shifted other actuator upon energization of its electric distortion effect element; de-energizing the first electric distortion effect element of said one actuator and simultaneously said second electric distortion effect element with said first electric distortion effect element of said other actuator energized to cause movement of said material strip in the same direction and to the extent of retraction of said second electric distortion effect element and repeating the above stepping sequence.

Other objects and features of the present invention will be clarified by the following explanation with reference to the drawings.

DESCRIPTION OF THE PREFERRED EMBODIMENTS

Figure 1:
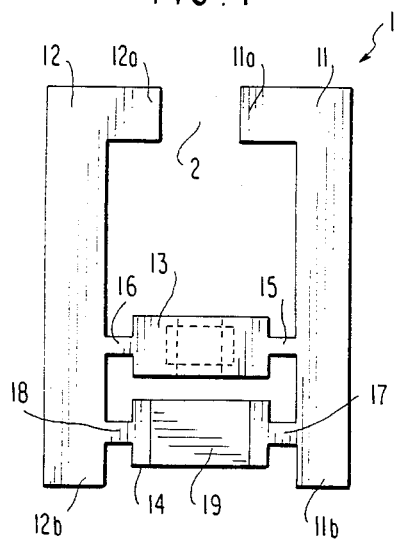
FIG. 1 is a plan view of a piezo-electric actuator according to the present invention.

Referring to FIG. 1, there is shown a plan view of one embodiment of the piezo-electric actuator forming the principal aspect of the present invention. The piezo-electric actuator indicated generally at 1, includes a pair of L-shaped arms, 11, 12, which arms extend generally parallel to each other and terminate in forward ends 11a, 12a, respectively, which ends are at right angles to each other and face each other to define a clamping space 2 between ends 11a, 12a of the arms. Near, the opposite, rear ends, 11b, 12b of the arms, the arms 11, 12 are interconnected by supports indicated generally at 13, 14. The supports extend at right angles to arms 11, 12 and are longitudinally spaced from each other, although located near the rear ends 11b, 12b, of the arms.

Support 13 may be formed of the same material as arms 11, 12 and, in the illustrated embodiment, the support 13 has reduced cross section portions 15, 16, at its ends, forming hinges thereby permitting the arms 11 and 12 to pivot about support 13 and to cause the forward ends 11a, 12a to move toward and away from each other, narrowing or enlarging the space 2 between the ends of those arms.

In similar fashion, support 14 includes reduced cross-sectional portions 17, 18, at its ends forming integral hinges with the arms 11, 12. The support 14 includes an electrical distortion effect element or piezo-electric element 19, intermediate of hinges 17, 18. Electrical distortion elements such piezo-electric devices are well known and their principles of operation are readily appreciated. A typical example of a desirable structure for such electrical distortion effect element 19 is disclosed in U.S. Pat. No. 4,523,121. When a D.C. electrical signal is applied between a pair of electrode terminals (not shown) of such elements, there is a mechanical elongation along one axis as a result of the applied electrical field, the distortion is mechanical amounting to an elongation along said one axis. Upon termination of the electrical field, the element retracts along that axis. In the simplified showing of the drawing, the electrical connections and the electrical power source to the piezo-electric element 19 is purposely not shown to simplify the understanding of the invention and its disclosure. Thus, as a result of application of an electrical signal, similar to the showing in FIG. 3, to the piezo-electric element 19, the elongation distortion of that element causes the rear ends 11b, 12b of the arms to move away from each other pivoting the arms 11, 12 about the hinges 15, 16 and causing the space 2 to be narrowed between the forward ends 11a, 12a of these arms. Hinges 17, 18 permit angulation of the arms 11, 12 with respect to piezo-electric element 19. The transferred distortion is amplified on the basis of the lever principle and the distance between the forward ends 11a, 12a of the arms 11 and 12 facing each other is shortened; therefore, the actuator 1 may function as a clamp to frictionally hold an object positioned within the gap or space 2 much like a pair of tweezers. If the electrical signal applied to the electrical distortion effect element 19 is removed, the arms 11 and 12 return to their original generally parallel positions with the gap or space 2 being enlarged and thus releasing any object previously captured therebetween.

Figure 2:
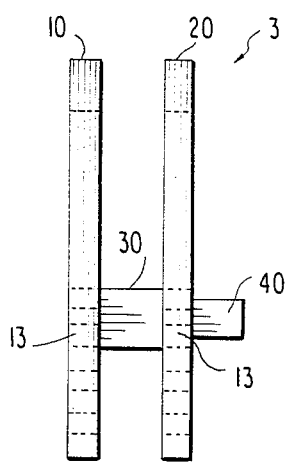
FIG. 2 is a side view of a piezo-electric clamp assembly utilizing two actuators as shown in FIG. 1.

While the piezo-electric actuator 1 of FIG. 1 has been described with reference to its use as a clamp, it has a number of other uses, for instance, a pair of electrical contacts may be positioned on opposite end faces of the forward ends 11a, 12a of arms 11 and 12 so that the effect of pivoting arms 11 and 12 to reduce or eliminate the gap 2 by appropriate energization of the piezo-electric element 19 results in a completion of an electric circuit between those contacts. However, the piezo-electric actuator of FIG. 1 will be referred to hereinafter as a clamp, particularly where multiple piezo-electric actuators are mechanically coupled through a further support joining a pair of such clamps in laterally spaced positions and particularly where that support itself constitutes a further or second piezo-electric element, thereby defining a clamp assembly 3. Such an arrangement is shown in FIG. 2 and has useful application in the formation of a linear or rotary electric stepping motor. Further, the principles of the stepping motor of FIG. 3 has application to many stepping devices capable of transferring strip material linearly or rotatively by using a pair of clamps, alternately energized and preferably in conjunction with a piezo-electric element functioning as a part or all of the lateral support between spaced clamps. FIGS. 4A through 4E, schematically represent the sequence of events occurring in stepping the rotary disc of the rotary stepping motor 5 of FIG. 3.

Referring next to FIG. 2, that figure shows a clamping assembly indicated generally at 3 which is comprised of a pair of clamps 10, 20, which have their longitudinal axes parallel to each other and are laterally spaced and maintained in parallel position by an electrical distortion effect element or piezo-electric element 30. Further, in this case clamp 20 is connected to a fixing terminal 40 permitting its support 13 to be fixedly positioned. In that respect, the fixing terminal 40 is fixedly attached to the side of the support 13. Like elements of the clamps 10, 20 in FIG. 2 have corresponding numerical designations to those of the clamp or piezo-electric actuator 1 of FIG. 1. The piezo-electric element 30 in FIG. 2 is physically oriented and fixedly mounted between opposing faces of supports 13 for the two clamps 10, 20 such that application of an electrical signal to the electrical distortion element or piezo-electric element 30 causes an elongation distortion of that element in the direction of its longitudinal axis moving the clamps 10, 20 away from each other, while the removal of the electrical signal returns the piezo-electrical actuators or clamps 10, 20 to their original position.

Figure 3:
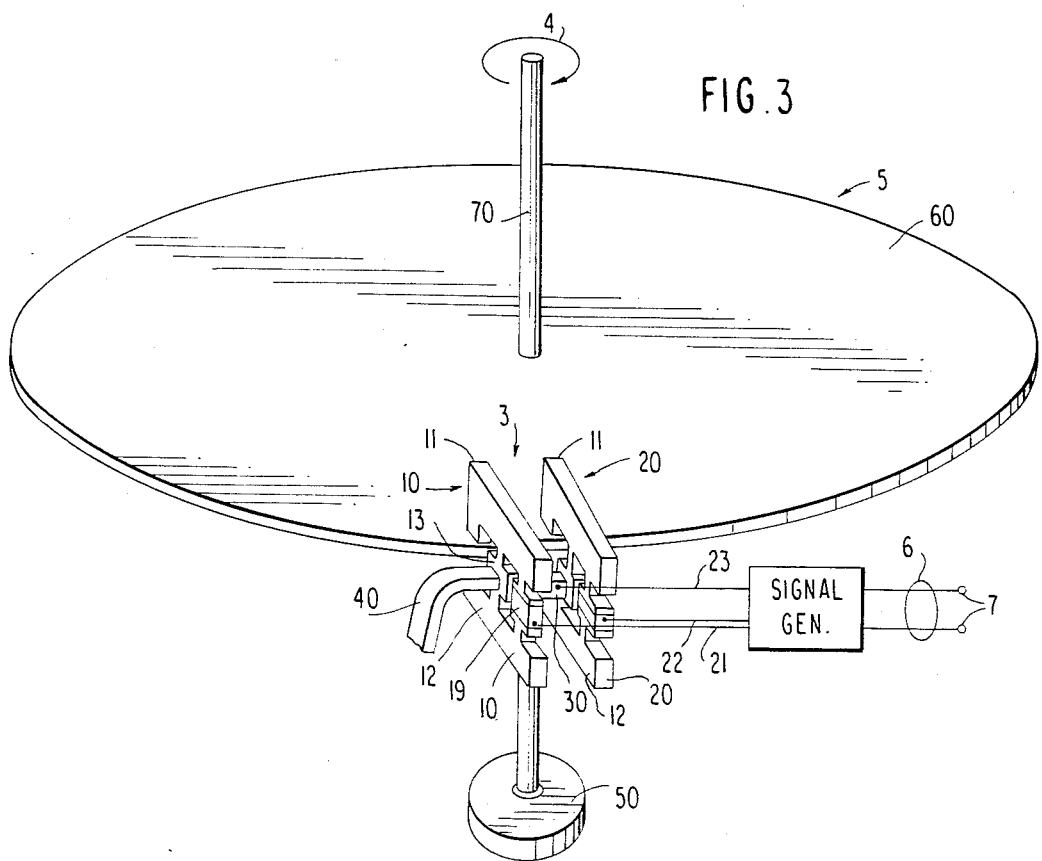
FIG. 3 is a perspective view of a rotary disc stepping motor utilizing a pair of piezo-electric actuators as shown in FIG. 1, forming the clamp assembly as shown in FIG. 2.

Turning next to FIG. 3, that Figure illustrates a rotary stepping motor 5 constituting one form of a stepping device, which in this case is capable of step rotating a disc by using the piezo-electric clamping assembly 3 shown in FIG. 2. Again, like elements have like numeral designations. The piezo-electric stepping motor in FIG. 3 is comprised principally of a clamping assembly 3. A vertical shaft 70 is mounted for rotation about its axis by means of a bearing 50, rotation being indicated by arrow 4. Shaft 70 fixially supports a thin circular disc 60 with the disc periphery passing between the gaps of upper and lower arms 11, 12 of the the clamps 10 and 20 of clamping assembly 3. The fixing terminal 40 extends outwardly and to the left of support 13 joining the upper and lower arms 11, 12 of clamp 10. As may be appreciated, the fixing terminal 40 is bent downwardly and may be mounted to a underlying horizontal support (not shown) which also functions to mount bearing 50 from which the motor shaft 70 projects. For stepping motor 5 in FIG. 3, the piezo-electric elements 19 are remote from the axis of rotation of disc 60 with the forward ends of the arms 11 and 12 overlying and underlying the disc 60, respectively. Electrical power may be supplied to the stepping motor 5 through appropriate electrical leads 6 connected to an electrical source (not shown) via terminals 7, those leads connecting to a signal generator 8. Appropriate electric signals are supplied by the signal generator 8 via line 21 to the piezo-electric element 19 for clamp 10, via line 22 to the piezo-electric element 19 for clamp 20 and via line 23 to the piezo-electric element 30 physically, laterally connecting the two clamps 10, 20.

The principles of operation of the stepping motor or stepping device 5 of FIG. 3 is explained with further reference to FIGS. 4A through 4E, inclusive. These Figures show schematically, a series of actions of clamps 10, 20 and the electrical distortion element or piezo-electric element 30 and the effect of selective and periodic energization of these elements on the disc 60 to effect a stepping motion counterclockwise as indicated by arrow 4, FIG. 3. The stepping action is repeated by following in sequence FIGS. 4A through 4E.

Figure 4A:
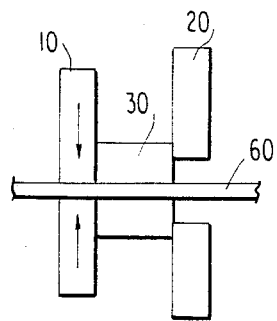
FIGS. 4A through 4E, inclusive, illustrate schematically in sequence the operating principle of the stepping motor shown in FIG. 3.

In that respect, FIG. 4A shows stepping motor 5 in a state in which the disc 60 is clamped by clamp 10 as a result of energization of its piezo-electric element 19. Piezo-electric element 30 is de-energized as well as the piezo-electric element 19 of clamp 10. Under these conditions, the piezo-electric element 19 of clamp 20 is in its normal state and the disc 60 is not clamped by the laterally spaced clamp element 20.

Figure 4B:
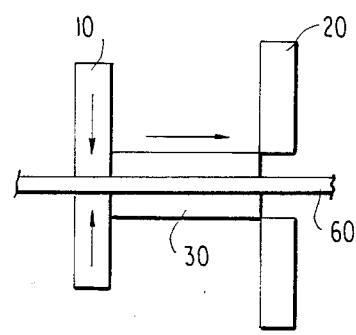

The next step as seen by FIG. 4B is the energization of the piezo-electric element 30 while maintaining clamping by clamp 10 with clamp 20 released. The effect of this is a shift to the right physically of clamp 20 while it is unclamped from the disc 60 by elongation of the piezo-electric element 30. The other aspects are the same as the state 4A with the exception of the elongation distortion of piezo-electric element 30.

Figure 4C:
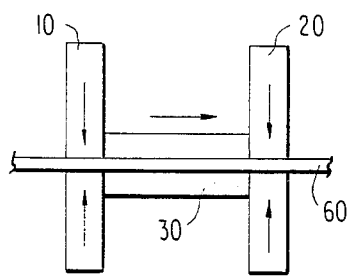

In FIG. 4C, the next action in the sequence of operation is the application of an electrical signal to the piezo-electric element 19 of the second clamp 20 to effect the clamping of the arms 11, 12 of that clamp against the disc 60 at its periphery.

Figure 4D:
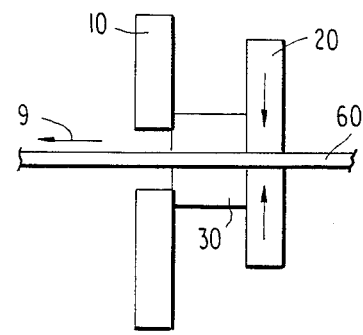
Figure 4E:
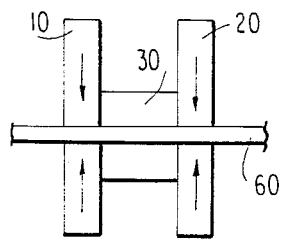

Under conditions as shown in FIG. 4D, clamp 20 remains in a clamped mode by maintaining the electrical signal through line 22 to the piezo-electric element 19 of clamp 20. Electrical signals are terminated from the signal generator 8 through lines 21 and 23 to the piezo-electric element 19 of clamp 10 and the piezo-electric element 30, respectively. As a result of the de-energization of piezo-electric element 30, that element contracts with its axial electrical elongation distortion effect removed and since the unclamped clamping element 10 is fixedly attached by way of the fixing terminal 40, the clamp 20 is pulled to the left, as well as the captured disc 60, causing the disc 60 to increment to the left, as indicated by arrow 9. This increments the disc 60 to the left for a partial rotation about the axis of the shaft 70. At this point, clamp 10 has its piezo-electric element 19 energized and clamping is effected by clamp 10, FIG. 4E, along with clamp 20. The sequence is then re-initiated as shown in FIGS. 4A, 4B, 4C, 4D and 4E for another cycle of operations with rotation of a like increment of disc 60 about its axis of rotation.

The clamping pressure of clamps 10, 20 may be freely selected by selecting the level or value of the DC electrical signal applied to the electrical distortion effect or piezo-electric element 19 of each of the clamps 10, 20 for the stepping device of FIG. 3 and the speed of step rotation of disc 60 can be suitably varied by selecting the cycle frequency of the applied electrical signals. The extent of the elongation distortion of the electrical distortion effect element or piezo-electric element 30 can be freely varied by selecting the voltage applied by the electrical signal through line 23 to that element. The cyclic extension and retraction of clamp 20 relative to clamp 10 can be varied by varying the cycle of the applied electrical signals through line 23 to that element. The direction of movement of the disc is selected by changing the timing of energization of the piezo-electric elements 19 of clamps 9 and 10 and 20 with respect to the times of energization and de-energization of piezo-electric element 30 coupling the two clamps 10, 20.

When it is desired to fix the disc 60 during a power failure, a piezo-electric actuator or clamping device such as that at 1 is modified so that the electrical distortion effect element or piezo element 19 in FIG. 1 is within support 8 and the support 14 functions solely as a hinge at the rear ends 11b, 12b of arms 11, 12 along with proper sizing of the forward ends 12a, 11a and the gap therebetween. As such, clamping elements 10, 20 may be set to clamp disc 60 as shown in FIG. 3 during normal (de-energized) state of the piezo-electric element 19. In addition, as may be appreciated, the direction of rotation of disc 60 may be changed from clockwise to counterclockwise and the rotational speed can be varied by suitably selecting the diameter of the disc while providing a large rotation torque, rapid stopping of the disc effect, as well as small backlash.

A prototype stepping device was manufactured in accordance with FIG. 3 utilizing a disc having a diameter of 5 cm. It was possible to control the rotation angle of the disc within a tolerance of several thousands of a centimeter to obtain a rotation speed of 30 rpm and to improve the electrical to mechanical energy conversion efficiency by a factor of 5 times that of a conventional stepping motor. Furthermore, the piezo-electric actuator such as that illustrated in FIG. 1 is meritorious in that it can be driven at a voltage from 0 to 50 volts which is considerably lower than the voltage normally applied to a piezo-electric ceramic actuator.

While the invention has been particularly shown and desribed with reference to preferred embodiments thereof, it will be understood by those skilled in the art that various changes and details may be made therein without departing from the spirit and scope of the invention.

What is claimed is:

1. A stepping device comprising; a clamping assembly comprising first and second laterally spaced clamps, each clamp comprising two generally parallel arms having forward and rearward ends, first and second supports between said arms physically connecting said two arms at longitudinal spaced positions intermediate of said forward and rearward ends, one of said supports comprising an electric distortion element having elongation distortion in a direction tending to separate said arms, the other support constituting a hinge connection between said two arms, and a second electric distortion effect element fixedly connected at its end to respective sides of said supports constituting said hinge connection between the arms of said clamps, and a plate having an edge thereof positioned between opposed forward ends of said two arms of both clamps and mounted for movement in a direction through the gaps between the forward ends of said arms of said first and second clamps, such that controlled periodic application of electrical voltage selectively to said first electric distortion effect elements and said second electric distortion element of said assembly causes step movement of said plate relative to said first and second clamps.

2. The stepping device as claimed in claim 1, wherein said plate comprises a rotary disc mounted for rotation about an axis parallel to said first and second clamps with the periphery of the plate passing between opposed forward ends of said arms of both said first and second clamps.

3. The stepping device as claimed in claim 1, further comprising a fixing terminal fixedly mounting one of said first and second clamps.

4. The stepping device as claimed in claim 1, further comprising means for generating electrical signals, means for connecting said signal generating means to a source of electrical voltage, means connecting said electrical signal generator means to said first elements and said second elements of said assembly, and wherein said electrical signal generating means includes means for varying the timing and level of the electrical signals applied to said first and second elements of said assembly via said connecting means.

5. A clamping assembly comprising:
   first and second clamps, each clamp comprising two laterally spaced arms having forward and rearward ends, first and second supports extending between said two arms and interconnecting said two arms at longitudinally spaced positions, one of said supports constituting a pivot connection for said two arms, the other of said supports including a first electric distortion effect element;

a second electric distortion effect element fixedly positioned at its ends to the respective supports of said first and second clamps defining a hinge coupling between the two arms thereof;

means for selectively energizing said first electric distortion effect elements to permit said clamps to grip a strip-like member positioned between the arm forward ends thereof;

means for selectively energizing said second electric distortion effect element to permit elongation of that element and a lateral displacement of the second clamp with respect to the first clamp; and a fixing terminal element fixed to one of said first and second clamps to fix said assembly.

* * * * *